United States Patent [19]

Derouane et al.

[11] Patent Number: 4,619,818

[45] Date of Patent: Oct. 28, 1986

[54] CRYSTALLINE ANTIMONOPHOSPHOALUMINATE

[75] Inventors: Eric G. Derouane, Namur, Belgium; Roland von Ballmoos, Hopewell, N.J.

[73] Assignee: Mobil Oil Corporation, New York, N.Y.

[21] Appl. No.: 718,269

[22] Filed: Apr. 1, 1985

Related U.S. Application Data

[63] Continuation-in-part of Ser. No. 615,495, May 30, 1984, abandoned.

[51] Int. Cl.$^4$ ............................................. C01B 25/36
[52] U.S. Cl. ..................................... 423/306; 423/305; 423/326; 423/328; 502/208; 502/214
[58] Field of Search ............... 423/305, 306, 326, 328; 502/150, 162, 164, 208, 214

[56] References Cited

U.S. PATENT DOCUMENTS

| | | | |
|---|---|---|---|
| 3,697,550 | 10/1972 | Bayne et al. | 260/346 |
| 3,801,704 | 4/1974 | Kobayashi et al. | 423/309 |
| 3,904,550 | 9/1975 | Pine | 252/437 |
| 4,014,945 | 3/1977 | Zimmerschied et al. | 260/635 |
| 4,071,471 | 1/1978 | Banks et al. | 252/437 |
| 4,158,621 | 6/1979 | Swift et al. | 208/114 |
| 4,179,358 | 12/1979 | Swift et al. | 208/114 |
| 4,210,560 | 7/1980 | Kehl | 252/437 |
| 4,222,896 | 9/1980 | Swift et al. | 252/437 |
| 4,228,036 | 10/1980 | Swift et al. | 252/437 |
| 4,310,440 | 1/1982 | Wilson et al. | 252/435 |
| 4,361,705 | 11/1982 | Marcelin et al. | 568/462 |
| 4,365,095 | 12/1982 | Marcelin et al. | 568/462 |
| 4,385,994 | 5/1983 | Wilson et al. | 210/689 |
| 4,397,825 | 8/1983 | Whittam | 423/326 |
| 4,440,871 | 4/1984 | Lok et al. | 502/214 |
| 4,456,582 | 6/1984 | Marosi et al. | 423/326 |

FOREIGN PATENT DOCUMENTS 0063436 10/1982 European Pat. Off. ............ 423/328

OTHER PUBLICATIONS

Haggin, C & EN, Jun. 20, 1983, pp. 36 & 37.

*Primary Examiner*—John Doll
*Assistant Examiner*—Jackson Leeds
*Attorney, Agent, or Firm*—Alexander J. McKillop; Michael G. Gilman; Dennis P. Santini

[57] ABSTRACT

A new composition comprising crystalline antimonophosphoaluminate, designated MCM-14, and the novel method for its synthesis are provided. The composition has ion-exchange properties and is readily convertible to catalytically active material. The synthesis method requires two liquid phases comprising a suitable organic or inorganic directing agent and specific reactants.

8 Claims, No Drawings

CRYSTALLINE ANTIMONOPHOSPHOALUMINATE

CROSS-REFERENCE TO RELATED APPLICATION

This application is a continuation-in-part of Ser. No. 615,495, filed May 30, 1984 now abandoned.

BACKGROUND OF THE INVENTION

1. Field of the Invention

Synthetic crystalline antimonophosphoaluminate designated- MCM-14, a novel composition of matter, is synthesized in a novel way from a reaction medium consisting of two liquid phases comprising directing-agent and specific reactants. This synthesis results in a antimonophosphoaluminate crystalline framework having ion-exchange properties and being readily convertible to catalytically active material.

2. Description of Prior Art

Aluminum phosphates are taught in U.S. Pat. Nos. 4,310,440 and 4,385,994, for example. Aluminum phosphate materials have electroneutral lattices and, therefore, are not useful as ion-exchangers or as catalyst components. Microporous aluminum phosphates have a composition typified as:

$$xR:Al_2O_3:(1.0\pm0.2) P_2O_5:yH_2O$$

wherein R is an organic amine or quaternary ammonium salt entrapped within the aluminum phosphate and playing a role as crystallization template, x and y representing the amounts of R and $H_2O$ needed to fill the microporous voids. Because of the aluminum/phosphorus atomic ratio of these materials being about unity, they display virtually no ion-exchange properties, the framework positive charge on phosphorus being balanced by corresponding negative charge on aluminum:

$$AlPO_4 = (AlO_2^-)(PO_2^+)$$

U.S. Pat. No. 4,440,871 teaches material called silicoaluminophosphate without non-aluminum metals.

The phosphorus-substituted zeolites of Canadian Patent Nos. 911,416; 911,417 and 911,418 are referred to as "aluminosilicophosphate" zeolites. Some of the phosphorus therein appears to be occluded, not structural. These latter materials containing silicon, aluminum and phosphorus are characterized by the general formula:

$$M_{(x-y)}:x(AlO_2^-):(SiO_2):y(PO_2^+):zH_2O$$

wherein M is a monovalent cation, x is approximately 0.125–1.5, y is 0.05–1.0 and z is the number of hydration water molecules. Structural replacement of silicon with phosphorus has been realized in materials called silica clathrates (West Germany Patent No. 3,128,988).

U.S. Pat. No. 4,363,748 describes a combination of silica and aluminum-calcium-cerium phosphate as a low acid activity catalyst for oxidative dehydrogenation. Great Britain Patent No. 2,068,253 discloses a combination of silica and aluminum-calcium-tungsten phosphate as a low acid activity catalyst for oxidative dehydrogenation. U.S. Pat. No. 3,801,704 teaches an aluminum phosphate treated in a certain way to impart acidity. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by pre-molded silicates or aluminosilicates.

Other teachings of aluminum phosphates and their preparation include U.S. Pat. Nos. 4,365,095; 4,361,705; 4,222,896; 4,210,560; 4,179,358; 4,158,621; 4,071,471; 4,014,945; 3,904,550 and 3,697,550. Since their neutral framework structure is void of ion-exchange properties, they are used as catalyst supports or matrices. The crystalline antimonophosphoaluminate synthesized hereby is a molecular sieve structure exhibiting ion-exchange properties and is easily and conveniently converted to material having intrinsic catalytic activity. Techniques for synthesis of zeolites or aluminum phosphates taught in the art are not useful for synthesis of this crystalline antimonophosphoaluminate.

SUMMARY OF THE INVENTION

A method is provided for synthesis of crystalline MCM-14 which has microporosity and catalytic activity, exhibits ion-exchange properties and the ready ability for conversion to material having catalytic activity. MCM-14, an AFI structure type material, exhibits an unusual Temperature Programmed Ammonia Desorption (TPAD) peak at less than 200° C. The AFI structure type material designated "SAPO-5" (U.S. Pat. No. 4,440,871), for comparison, exhibits a TPAD peak at about 230° C.

The method comprises first preparing a reaction mixture composed of two liquid phases, an organic phase and an aqueous phase. The organic phase comprises an organic solvent such as a $C_5$–$C_{10}$ alcohol or mineral spirits, as non-limiting examples, and a metal, hereinafter more specifically defined, source, e.g., an alkoxymetallate as a non-limiting example, soluble in said solvent. A silicon source, such as an alkoxy-silicate, for example, soluble in said solvent may, if desired, also be present in the organic phase.

An organic directing agent is selected from the group consisting of onium compounds having the formula:

$$R_4E^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; E is a tetracoordinate element (e.g. nitrogen or phosphorus); and X is an anion (e.g. fluoride, chloride, bromide, iodide, hydroxide, acetate, sulfate, carboxylate, etc.). Other organic directing agents are selected from the group consisting of dionium compounds and amines, e.g. monoamines, diamines and triamines. Particularly preferred directing agents for the present method include onium compounds, above defined, wherein R is alkyl of 1 to 4 carbon atoms, E is nitrogen and X is halide or hydroxide. Non-limiting examples of these include tetrapropylammonium hydroxide, tetraethylammonium hydroxide and tetrapropylammonium bromide. An inorganic hydroxide or salt of suitable composition can also be used as directing agent, non-limiting examples of which include KOH, NaOH, CsOH, Ca(OH)$_2$, NaCl, CsBr, and the like.

The method comprises maintaining the reaction mixture under critical conditions of temperature, pH and heating rate to synthesize the desired antimonophosphoaluminate. The reaction mixture must be heated at a rate of from about 5° C. to about 200° C. per hour up to a temperature of from about 80° C. to about 300° C. and maintained there for from about 2 hours to about 500 hours until crystals of antimonophosphoaluminate are formed. The pH of the reaction mixture must be maintained at from about 2 to about 9 during the heating and crystallization period. This may be accomplished by adjusting the concentration(s) of the added base(s).

After crystals of the desired antimonophosphoaluminate are formed, they may be separated from the reaction mixture by filtration, and then washed with water and dried, such as by heating.

The antimonophosphoaluminate is characterized by a composition in which the number of atoms of aluminum and phosphorus, is greater than the number of atoms of antimony metal plus any silicon, hereinafter more particularly defined and presented as "M", i.e. $Al+P>M$. It is named "antimonophosphoaluminate" in view of its crystalline composition and of the charge distribution on its framework tetrahedral T-sites. The characteristic composition of MCM-14, in the anhydrous state and as synthesized, is as follows:

$$A_v : Q_{51 i/q} |^{q+} (AlO_2^-)_{1-x} : (PO_2^+)_{1-y} : (MO_2^{m-4})_{x+y} : T_{|j/t|}{}^{t-}$$

wherein v is the number of moles of A, occluded organic material resulting from organic directing agent and/or solvent used in synthesis of and filling microporous voids of the antimonophosphoaluminate, which material may be removed upon calcination, Q is a cation of valence q, T is an anion of valence t, and M is one or more elements of valence m (weighted average) selected from the group consisting of $Sb^{+3}$ and combination thereof with $Si^{+4}$, and x, y, i and j are numbers which satisfy the relationship:

$$z = i - j, \text{ and}$$

$$z = y - x + (4 + m) \cdot (x + y)$$

wnerein z is a number of from greater than $-1$ to less than $+1$. When z is greater than 0, the antimonophosphoaluminate will mostly behave as a cation exchanger with potential use as an acidic catalyst. When z is less than 0, the antimonophosphoaluminate will mostly behave as an anion exchanger with potential use as a basic catalyst. In any event, the antimonophosphoaluminate will exhibit an ion exchange capacity of at least about 0.002 meq/g and a TPAD peak at less than 200° C.

The antimony component of element M is characterized by its oxidation number of $+3$ and its ionic "Radius Ratio" of 0.57. The silicon/antimony atomic ratio for M will be from about 0, e.g., 0.0005, to less than 1.

The term "Radius Ratio" is defined as the ratio of the crystal ionic radius of the element M to the crystal ionic radius of the oxygen anion, $O^{-2}$.

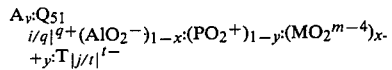

$$\text{Radius Ratio} = \frac{\text{crystal ionic radius of the element } M}{\text{crystal ionic radius of } O^{-2}}$$

The crystal ionic radii of elements are listed in the *CRC Handbook of Chemistry and Physics*, 61st Edition, CRC Press, Inc., 1980, pages F-216 and F-217, said listing incorporated herein by reference. In determining the Radius Ratio, it is necessary to use crystal ionic radii of the M atom and oxygen anion ($O^{-2}$) which have been measured by the same method.

The composition of the antimonophosphoaluminate MCM-14, following removal of the organic component, for example by calcination, is the following:

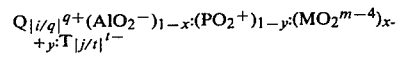

$$Q_{|i/q|}{}^{q+} (AlO_2^-)_{1-x} : (PO_2^+)_{1-y} : (MO_2^{m-4})_{x+y} : T_{|j/t|}{}^{t-}$$

where all symbols and letters have their aforementioned meanings.

EMBODIMENTS

The synthetic crystalline antimonophosphoaluminate MCM-14 is an effective cationic ion-exchanger and acid catalyst when the aforementioned parameter z is greater than zero. Such catalyst has an acid strength spectrum differing from that of aluminosilicate zeolites, which can be beneficial in some catalytic processes. For values of z lower than zero, anionic exchange properties prevail and render such material active for base-catalyzed reactions. MCM-14 is also a new class of catalyst support for metals and metal oxides and is particularly interesting in this respect because of its ion-exchange capacity. MCM-14 will show in the latter case the same catalytic flexibility as other supported metal catalysts. Sorption properties indicate that microporous antimonophosphoaluminate MCM-14 is molecular shape selective and this can be advantageous in numerous catalytic processes as known in the art of zeolite catalysis.

As synthesized, in general, the crystalline antimonophosphoaluminate MCM-14 comprises structural aluminum, phosphorus and element M, and will exhibit a M/aluminum plus phosphorus atomic ratio of less than unity and greater than zero, and usually within the range of from about 0.001 to about 0.99. The phosphorus/aluminum atomic ratio of such materials may be found to vary from about 0.01 to about 100.0, as synthesized. It is well recognized that aluminum phosphates exhibit a phosphorus/aluminum atomic ratio of unity, and no element M. Also, the phosphorus-substituted zeolite compositions, sometimes referred to as "aluminosilicophosphate" zeolites, have a silicon/aluminum atomic ratio of usually greater than unity, and generally from 0.66 to 8.0, and a phosphorus/aluminum atomic ratio of less than unity, and usually from 0 to 1.

The use of a two-phase synthesis reaction mixture system, exclusive of the solids, enables one to maintain in solution in the organic phase, one or more of the reactants which are normally insoluble or unstable in the aqueous phase under the present synthesis conditions. Such a procedure enables the preparation of antimonophosphoaluminate. Further, microporous properties can be achieved for the crystalline antimonophosphoaluminate MCM-14 by performing inorganic synthesis in the presence of the organic or inorganic directing agent(s). In addition to its templating role, the organic directing agent can also act as a surfactant. It can help the codispersion of the organic and aqueous phases containing the reagents.

In the synthesis method, the reaction mixture will contain sources of element M, phosphorus and aluminum, directing agent(s), and an organic solvent as defined above.

The overall molar composition of the two-phase synthesis mixture, in terms of oxides and organic components, is

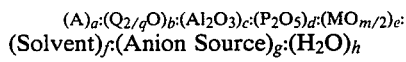

where $a/(c+d+e)$ is less than 4, $b/(c+d+e)$ and $e/(c+d)$ are less than 2, $f/(c+d+e)$ is from 0 to 15, $g/(c+d+e)$ is less than 2, and $h/(c+d+e)$ is from 3 to 150.

The reaction mixture is heated carefully at a rate of from about 5° C. to about 200° C. per hour up to a temperature of from about 80° C. to about 300° C. and maintained within that temperature range until crystals of desired antimonophosphoaluminate MCM-14 form, usually from about 5 hours to about 500 hours. The pH of the reaction mixture during crystallization is carefully maintained at from about 2 to about 9. This may be accomplished by adjusting the concentration of the added bases.

Following crystallization of the desired antimonophosphoaluminate, the reaction mixture containing same is filtered and the recovered crystals are washed, for example with water, and then dried, such as by heating at from about 25° C. to about 150° C. at atmospheric pressure.

The useful sources of aluminum include, as non-limiting examples, any known form of aluminum oxide or hydroxide, organic or inorganic salt and compound.

The useful sources of element M include, as non-limiting examples, any known form of the element antimony, its oxide or hydroxide or salt, alkoxy or other organic compound. M may also include silicon.

The useful sources of phosphorus include, as non-limiting examples, any known form of phosphorus acids or oxides, phosphates and phosphites, and organic derivatives of phosphorus.

The organic compounds of the organic phase may act as solvent and may be, for example, one or more compounds selected from the group consisting of alcohols, e.g. organic hydroxy compounds including alkanols of from 5 to about 10 carbon atoms, phenols and naphthols and other water immiscible organic solvents. Polar organic compounds are preferred for the organic phase.

The aqueous phase of the reaction mixture comprises from the elements phosphorus, aluminum and element M those not included in the organic phase.

In a more specific illustration of the synthesis method, the aqueous phase contains the phosphorus and aluminum reagents, for example phosphoric acid and alumina. The organic phase with hexanol as solvent contains the element M source, such as a tetra-orthoalkoxide. The organic directing agent, e.g. tetraalkylammonium hydroxide, also acts as a surfactant to emulsify the aqueous and organic phases and optimize the interface. The element M is progressively supplied during synthesis to the gel by hydrolysis of its organic compound and transfer of the product through the interface into the aqueous phase.

As element M, aluminum and phosphorus must be available simultaneously to nucleate and crystallize antimonophosphoaluminate MCM-14, the rates of supply of all three elements have to be comparable. This implies that the neutralization reaction between, for example, $H_3PO_4$ and $Al_2O_3$ and the hydrolysis of the organic M compound have to be concerted. Therefore, it may be important to predigest the alumina - phosphoric acid mixture. Even more critical will be the element M supply rate which is depending on factors such as the magnitude of the interface, temperature, pH of the aqueous phase, concentration, and nature of the organic solvent and of the M reagent.

A screening of information from numerous syntheses performed over a range of conditions shows that the antimonophosphoaluminate crystallization by the present method occurs in two steps. The first step involves formation of the M-P-Al-containing gel at relatively low temperature and short time, thereby allowing for hydrolysis and transfer of M and preventing growth of aluminum phosphates. The second step involves crystallization of the antimonophosphoaluminate from the gel at a higher temperature.

Because the hydrolysis and transfer rates of the element M are controlled by the magnitude of the interface, as discussed earlier, its incorporation is expected to be favored as mixing increases.

As mentioned earlier, pH is a critical synthesis variable. As the formation of the antimonophosphoaluminate proceeds, pH values around or above neutral (i.e. about 6 or more, up to a maximum of 9) should be maintained. As the base stability of antimonophosphoaluminate is expected to be intermediate between those of aluminum phosphates and zeolites, pH values of about or slightly above 8 are preferred. Because of the major role played by the hydrolysis of the element M reagent and the necessity to control it in the present method, there is a need to have a nearly constant pH during crystallization (in particular, to avoid rapid acid hydrolysis of the M source). This can be achieved by predigestion of alumina in phosphoric acid before addition of the other reagents, which raises the initial pH of the synthesis mixture to 5–7.

To achieve and maintain higher pH values (pH=8 or above), even after partial decomposition of the organic hydroxide, inorganic bases may be added, which can also play a role as directing agents.

The antimonophosphoaluminate MCM-14 prepared hereby is an AFI structure type molecular sieve which possesses a definite distinguishing crystalline structure exhibiting a characteristic X-ray powder diffraction pattern as shown in Table 1.

TABLE 1

| Interplanar d-Spacing (A) | Relative Intensity |
|---|---|
| 11.80 ± 0.2 | s–m |
| 6.84 ± 0.05 | w |
| 5.91 ± 0.05 | m–w |
| 4.46 ± 0.05 | s |
| 4.21 ± 0.05 | vs |
| 3.96 ± 0.03 | vs |
| 3.41 ± 0.03 | m |
| 3.07 ± 0.03 | w |
| 2.96 ± 0.02 | w |
| 2.66 ± 0.02 | w |
| 2.58 ± 0.02 | w |

These X-ray diffraction data were collected with a Rigaku X-ray system, using copper K-alpha radiation. The positions of the peaks, expressed in degrees 2 theta, where theta is the Bragg angle, were determined by step-scanning at 0.02 degrees of 2 theta intervals and a counting time of 1 second for each step. The interplanar spacings, d, measured in Angstrom units (A), and the relative intensities of the lines, $I/I_o$, where $I_o$ is one-hundredth of the intensity of the strongest line, including subtraction of the background, were derived with the use of a profile fitting routine. The relative intensities are given in terms of the symbols vs=very strong (75–100%), s=strong (50–74%), m=medium (25–49%) and w=weak (0–24%). It should be understood that this X-ray diffraction pattern is characteristic of all the species of MCM-14 compositions synthesized by the present invention. Ion exchange of cations with other ions results in a antimonophosphoaluminate which reveals substantially the same X-ray diffraction pattern with some minor shifts in interplanar spacing and variation in relative intensity. Other variations can occur, depending on the M/aluminum and phosphorus/aluminum ratios of the particular sample, as well as its degree of thermal treatment.

The antimonophosphoaluminate synthesized hereby can also be used as catalyst in intimate combination with a metal component such as silver, tungsten, vanadium, molybdenum, rhenium, chromium, manganese, or a Group VIII metal such as platinum or palladium where for example a hydrogenation-dehydrogenation or oxidation function is to be performed. Such component can be ion-exchanged into the composition, impregnated therein or intimately physically admixed therewith. Such component can be impregnated in or onto MCM-14 such as for example, by, in the case of platinum, treating the crystal with a solution containing a platinum metal-containing ion. Thus, suitable platinum compounds include chloroplatinic acid, platinum chloride and various compounds containing the platinum amine complex.

The original cations or anions of the as synthesized antimonophosphoaluminate can be replaced in accordance with techniques well known in the art, at least in part, by ion exchange with other cations or anions. Preferred replacing cations include metal ions, hydrogen ions, hydrogen precursor, e.g. ammonium, ions and mixtures thereof. Particularly preferred cations include hydrogen, rare earth metals and metals of Groups IIA, IIIA, IVA, IB, IIB, IIIB, IVB, VIB and VIII of the Periodic Table of the Elements.

Typical ion exchange technique would be to contact the synthetic crystalline antimonophosphoaluminate with a salt of the desired replacing ion or ions. Examples of such salts of cations include the halides, e.g. chlorides, nitrates and sulfates.

The antimonophosphoaluminate prepared in accordance herewith can be beneficially converted to another form by thermal treatment. This thermal treatment is generally performed by heating one of these forms at a temperature of at least 350° C. for at least 1 minute and generally not longer than 20 hours. While subatmospheric pressure can be employed for the thermal treatment, atmospheric pressure is desired for reasons of convenience. The thermal treatment can be performed at a temperature up to about 1000° C. The thermally treated product is particularly useful in the catalysis of certain hydrocarbon conversion reactions.

Further, the antimonophosphoaluminate, when employed either as an adsorbent, ion-exchanger or as a catalyst in an organic compound conversion process should be dehydrated, at least partially. This can be done by heating to a temperature in the range of 200° C. to 600° C. in air or an inert atmosphere, such as nitrogen, etc. and at atmospheric, subatmospheric or superatmospheric pressures for between 30 minutes and 48 hours. Dehydration can also be performed at room temperature merely by placing the antimonophosphoaluminate in a vacuum, but a longer time is required to obtain a sufficient amount of dehydration. Therefore, depending upon the degree of dehydration or thermal treatment desired for the antimonophosphoaluminate, it may be subjected to heating at a temperature of from about 200° C. to about 1000° C. for a time of from about 1 minute to about 48 hours.

The crystals of the antimonophosphoaluminate prepared by the instant invention can be shaped into a wide variety of particle sizes. Generally speaking, the particles can be in the form of a powder, a granule, or a molded product, such as an extrudate having a particle size sufficient to pass through a 2 mesh (Tyler) screen and be retained on a 400 mesh (Tyler) screen. In cases where the composition is molded, such as by extrusion, the crystals can be extruded before drying or partially dried and then extruded.

It may be desired to incorporate the antimonophosphoaluminate MCM-14 with another material resistant to the temperatures and other condition employed in organic conversion processes. Such materials include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new antimonophosphoaluminate, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw sate as originally mined or initially subjected to calcination, acid treatment or chemical modification. Binders useful for compositing with the present crystal also include inorganic oxides, notably alumina or silica.

In addition to the foregoing materials, the antimonophosphoaluminate MCM-14 crystal can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline antimonophosphoaluminate material and inorganic oxide gel matrix vary widely, with the crystal content ranging from about 1 to about 90 percent by weight and more usually, particularly when the composite is prepared in the form of beads or extrudates, in the range of about 2 to about 80 weight percent of the composite.

Employing a catalytically active form of the novel MCM-14 material of this invention as a catalyst component, said catalyst possibly containing additional hydrogenation components, reforming stocks can be reformed employing a temperature of from about 370° C. to about 540° C., a pressure of from about 100 psig to about 1000 psig, preferably from about 200 psig to about 700 psig, a liquid hourly space velocity is from about 0.1 to about 10, preferably from about 0.5 to about 4, and a hydrogen to hydrocarbon mole ratio of from about 1 to about 20, preferably from about 4 to about 12.

A catalyst comprising the present MCM-14 molecular sieve can also be used for hydroisomerization of normal paraffins, when provided with a hydrogenation component, e.g. platinum. Such hydroisomerization is carried out at a temperature of from about 90° C. to about 375° C., preferably from about 145° C. to about 290° C. with a liquid hourly space velocity of from bout 0.01 to about 2, preferaby from about 0.25 to about 0.50, and with a hydrogen to hydrocarbon mole ratio of from about 1:1 to about 5:1. Additionally, such a catalyst can be used for olefin or aromatic isomerization, employing a temperature of from about 200° C. to about 480° C.

Such a catalyst can also be used for reducing the pour point of gas oils. This reaction is carried out at a liquid hourly space velocity of from about 10 to about 30 and at a temperature of from about 425° C. to about 595° C.

Other reactions which can be accomplished employing a catalyst comprising the MCM-14 of this invention containing a metal, e.g. platinum, include hydrogenation-dehydrogenation reactions and desulfurization reactions, olefin polymerization (oligomerization) and other organic compound conversions, such as the conversion of alcohols (e.g. methanol) or ethers (e.g. dimethylether) to hydrocarbons, and the alkylation of aromatics (e.g. benzene) in the presence of an alkylating agent (e.g. ethylene).

In order to more fully illustrate the nature of the invention and the manner of practicing same, the following examples are presented. In the examples, whenever adsorption data are set forth for comparison of sorptive capacities for various adsorbates, they were determined as follows:

A weighed sample of the calcined adsorbant was contacted with a flowing stream of the equilibrium vapor of the adsorbate at 25° C. admixed with dry nitrogen. The adsorbates were water vapor, n-hexane, 2-methylpentane, xylene, or cyclohexane vapors. The sample temperature was maintained at 90° C. for adsorbates other than ortho-xylene for which it was 120° C. and water for which it was 60° C. The increase in weight measured gravimetrically was converted to the adsorption capacity of the sample in g/100 g of calcined (450° C. at 20° C. per minute in air) adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). In the case of zeolite HZSM-5, only 174 ppm of tetrahedrally coordinated $Al_2O_3$ are required to provide an Alpha Value of 1. The Alpha Test is described in U.S. Pat. No. 3,3543,078 and in *The Journal of Catalysis*, Vol. IV, pp. 522–529 (August 1965), each incorporated herein by reference as to that description.

When ion-exchange capacity and temperature of the maximum rate of ammonia desorption are examined, they are determined by titrating with a solution of sulfamic acid the gaseous ammonia evolved during the temperature programmed decomposition of the ammonium-form of the antimonophosphoaluminate. The method is described in *Thermochimica Acta*, Vol. III, pp. 113–124, 1971, by G. T. Kerr and A. W. Chester, incorporated herein by reference as to that description. The Temperature Programmed Ammonia Desoprtion (TPAD) peak temperature is the temperature of the maximum rate of ammonia desorption from the ammonium form of the crystal material being tested.

EXAMPLE 1

A two-phase synthesis reaction mixture was prepared with the organic phase comprised of 10 g of $Sb(OC_2H_5)_4$ and 60 g 1-hexanol, and the aqueous phase comprised of 23.1 g $H_3PO_4$ (85%), 10 g $Al_2O_3$, 37 g TEAOH (40%) and 71 g of water. The reaction mixture as a whole had a composition including 10.8% Sb, 45% P and 44.2% Al, the percentages atomic. The directing agent in the organic phase was tetraethylammonium hydroxide.

The reaction mixture was heated at 50° C. per hour to 130° C. and maintained at that temperature for 24 hours. It was then heated to 180° C. and maintained there for 144 hours. During this time, mixing was obtained by spinning at 800 rpm. Initial and final pH was 7.5.

The crystalline product was separated from the reaction mixture by filtration, water washed and then dried at 80° C. The product crystalline antimonophosphoaluminate had a composition including 10.2% Sb, 47.0% P, and 42.8% Al, the percentages atomic. A sample of the as synthesized antimonophosphoaluminate was then submitted for X-ray analysis. It was found to be a crystalline molecular sieve exhibiting the characteristic diffraction lines shown in Table 2.

EXAMPLE 2

A quantity of the crystalline antimonophosphoaluminate of Example 1 was calcined at 450° C. in air for 4 hours and then X-ray analyzed. The results are presented in Table 3.

EXAMPLE 3

A quantity of the crystalline antimonophosphoaluminate of Example 1 was calcined as described in Example 2 and ammonium-exchanged using an aqueous solution of 1M $NH_4NO_3$. The ion-exchange capacity measured from the evolution of ammonia was determined to be 1.3 meq/g.

TABLE 2

| Interplanar d-Spacings (A) | Observed 2 × Theta | Relative Intensities $I/I_o$ |
|---|---|---|
| 11.7773 | 7.500 | 36.84 |
| 6.8081 | 12.993 | 6.06 |
| 6.4249 | 13.771 | 14.98 |
| 5.8932 | 15.021 | 17.47 |
| 4.4565 | 19.907 | 39.72 |
| 4.2346 | 20.961 | 61.28 |
| 3.9485 | 22.499 | 56.02 |
| 3.5998 | 24.712 | 3.18 |
| 3.4047 | 26.152 | 19.91 |
| 3.2167 | 27.710 | 100.00 |
| 3.0683 | 29.078 | 10.12 |
| 2.9517 | 30.254 | 14.99 |

TABLE 2-continued

| Interplanar d-Spacings (A) | Observed 2 × Theta | Relative Intensities I/I$_o$ |
|---|---|---|
| 2.7829 | 32.079 | 41.42 |
| 2.6560 | 33.717 | 5.29 |
| 2.5752 | 34.809 | 13.39 |

TABLE 3

| Interplanar d-Spacings (A) | Observed 2 × Theta | Relative Intensities I/I$_o$ |
|---|---|---|
| 11.8868 | 7.431 | 17.87 |
| 4.3356 | 20.468 | 31.16 |
| 4.1185 | 21.559 | 100.00 |
| 3.9570 | 22.450 | 21.24 |
| 3.4380 | 25.894 | 25.40 |
| 3.0728 | 29.035 | 64.02 |
| 2.9475 | 30.299 | 21.98 |
| 2.6532 | 33.755 | 13.83 |

EXAMPLE 4

A quantity of the ammonium exchanged MCM-14 material from Example 3 was heated on a DuPont Termogravimetric Analyzer in an inert nitrogen atomsphere at a rate of 10° C./minute to 1000° C. The weight loss was monitored and the evolved gases were titrated by dilute sulfamic acid. The weight vs temperature and the amount of titrant vs temperature curves were plotted, and the temperature of maximum ammonia desorption was read from the numeric data.

For comparison, a like quantity of "SAPO-5", made as described in Example 9 of U.S. Pat. No. 4,440,871, calcined and ammonium-exchanged in exactly the same fashion as the MCM-14 (Example 3), was also treated as above to determine the temperature of maximum ammonia desorption.

Results were:

| Material | TPAD peak, Tmax °C. |
|---|---|
| MCM-14 | 180 |
| SAPO-5 | 230 |

Repeated comparisons yielded the same results.

EXAMPLE 5

The product of Example 3 was examined by the Alpha Test and found to have an Alpha Value of 0.6.

EXAMPLE 6

A sample of the calcined product antimonophosphoaluminate of Example 3 was evaluated for sorption properties to confirm its molecular sieve nature. The results in weight percent were as follows:
hexane (90° C.): 0.60%
water (60° C.): 3.28%

What is claimed is:

1. A synthetic crystalline material comprising antimony, phosphorus and aluminum which, as synthesized, exhibts a characteristic X-ray diffraction pattern as shown in Table 1 of the specification, and a composition as follows:

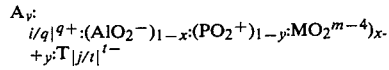

$$A_v: i/q|Q^{q+}:(AlO_2^-)_{1-x}:(PO_2^+)_{1-y}:MO_2^{m-4})_{x+y}:T|j/t|^{t-}$$

wherein A is occluded organic directing agent and solvent, v is the number of moles of A, Q is a cation of valence q, M is one or more elements of valence m selected from the group consisting of Sb$^{+3}$ and combintation thereof with Si$^{+4}$, and wherein less than 50% of the atoms of M are Si$^{+4}$, T is an anion of valence t, and x, y, i and j are numbers which satisfy the relationships:

$$z=i-j, \text{ and}$$

$$z=y-x+(4+m)\cdot(x+y)$$

wherein z is a number of from greater than −1 to less than +1, and which further exhibits a TPAD peak of less than 200° C. when in the ammonium form.

2. The crystalline material resulting from thermal treatment of the synthetic crystalline material of claim 1.

3. The crystalline material comprising the synthetic crystalline material of claim 1 having original cations replaced, at least in part, with a cation or a mixture of cations selected from the group consisting of hydrogen and hydrogen precursors, rare earth metals and metals from Groups IIA, IIIA, IVA, IB, IIB, IIIB, IVB, VIB and VIII of the Periodic Table of the Elements.

4. The crystalline material comprising the synthetic crystalline material of claim 2 having original cations replaced, at least in part, with a cation or a mixutre of cations selected from the group consisting of hydrogen and hydrogen precursors, rare earth metals and metals from Groups IIA, IIIA, IVA, IB, IIB, IIIB, IVB, VIB and VIII of the Periodic Table of the Elements.

5. The crystalline material resulting from thermal treatment of the crystalline material of claim 3.

6. The crystalline material resulting from thermal treatment of the crystalline material of claim 4.

7. A synthetic crystalline material according to claim 1, wherein up to 99.95% of the atoms of M are Sb$^{+3}$.

8. A synthetic crystalline material according to claim 1, wherein 100% of the atoms of M are Sb$^{+3}$.

* * * * *